(12) United States Patent
Kazuno

(10) Patent No.: US 9,837,948 B2
(45) Date of Patent: Dec. 5, 2017

(54) POWER SUPPLY SYSTEM

(71) Applicant: HONDA MOTOR CO., LTD., Tokyo (JP)

(72) Inventor: Shuichi Kazuno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/453,904

(22) Filed: Mar. 9, 2017

(65) Prior Publication Data

US 2017/0264228 A1 Sep. 14, 2017

(30) Foreign Application Priority Data

Mar. 9, 2016 (JP) .................. 2016-045647

(51) Int. Cl.
| | |
|---|---|
| *H02P 1/00* | (2006.01) |
| *H02P 3/00* | (2006.01) |
| *H02P 5/00* | (2016.01) |
| *H02P 7/00* | (2016.01) |
| *H02P 27/06* | (2006.01) |
| *H02M 3/158* | (2006.01) |
| *H02M 1/084* | (2006.01) |
| *H02P 6/14* | (2016.01) |
| *H02M 1/00* | (2006.01) |

(52) U.S. Cl.
CPC ............ *H02P 27/06* (2013.01); *H02M 1/084* (2013.01); *H02M 3/158* (2013.01); *H02P 6/14* (2013.01); *H02M 2001/0009* (2013.01)

(58) Field of Classification Search
CPC ............................... H02P 27/06; H02M 3/158
USPC ....................................................... 318/442
See application file for complete search history.

(56) References Cited

FOREIGN PATENT DOCUMENTS

JP         2014-166103         9/2014

*Primary Examiner* — Erick Glass
(74) *Attorney, Agent, or Firm* — Mori & Ward, LLP

(57) ABSTRACT

A power supply system includes a first power supply, a second power supply, a first voltage converter, a second voltage converter, and circuitry. The circuitry is configured to control the first voltage converter to boost a first output voltage when the first power supply and the second power supply electric power to the load such that first passing power and second passing power are within a passing power range. The circuitry is configured to control the second voltage converter to stop boosting the second output voltage so as to supply the electric power from the second power supply directly to the load when the first power supply and the second power supply the electric power to the load such that the first passing power and the second passing power are within the passing power range.

6 Claims, 11 Drawing Sheets

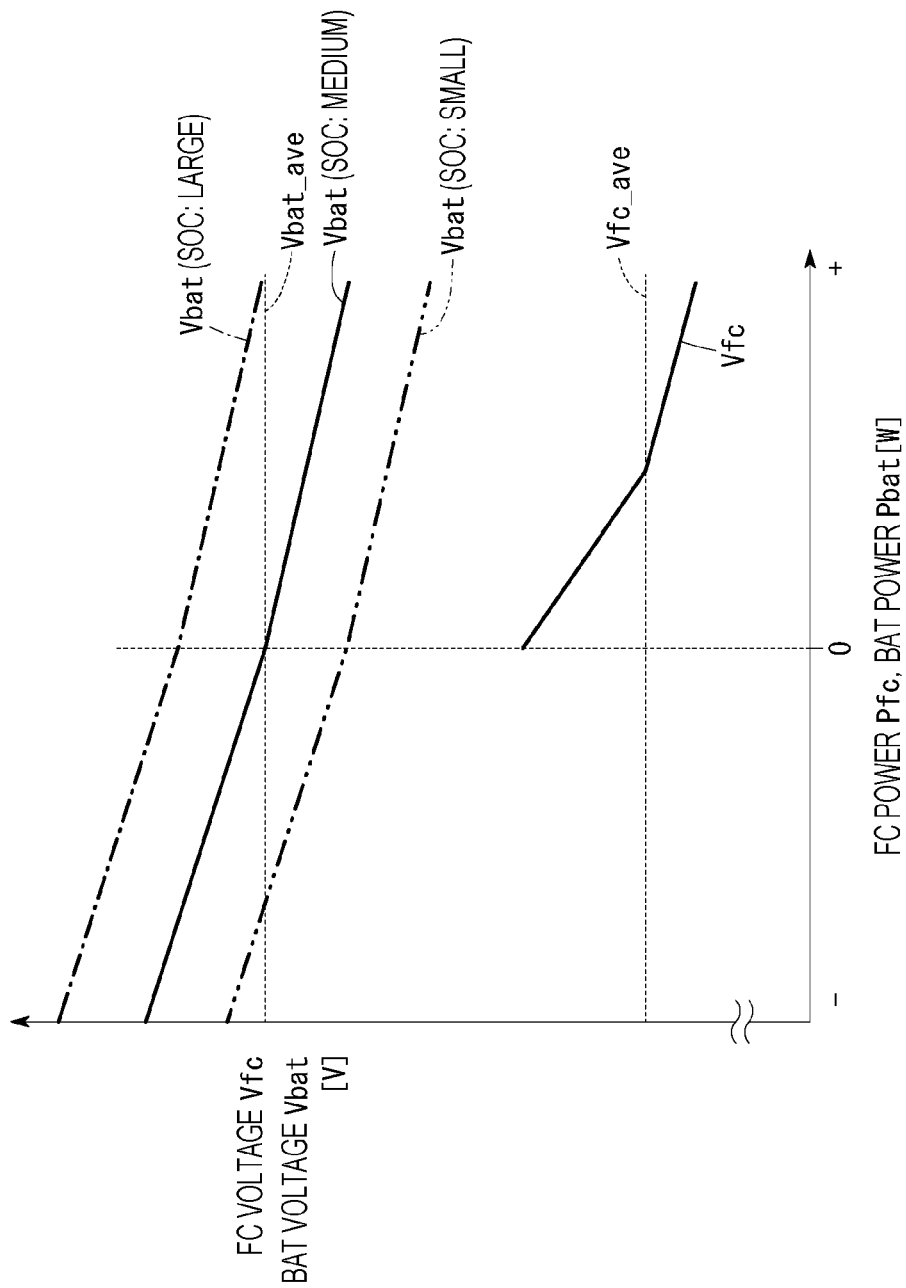

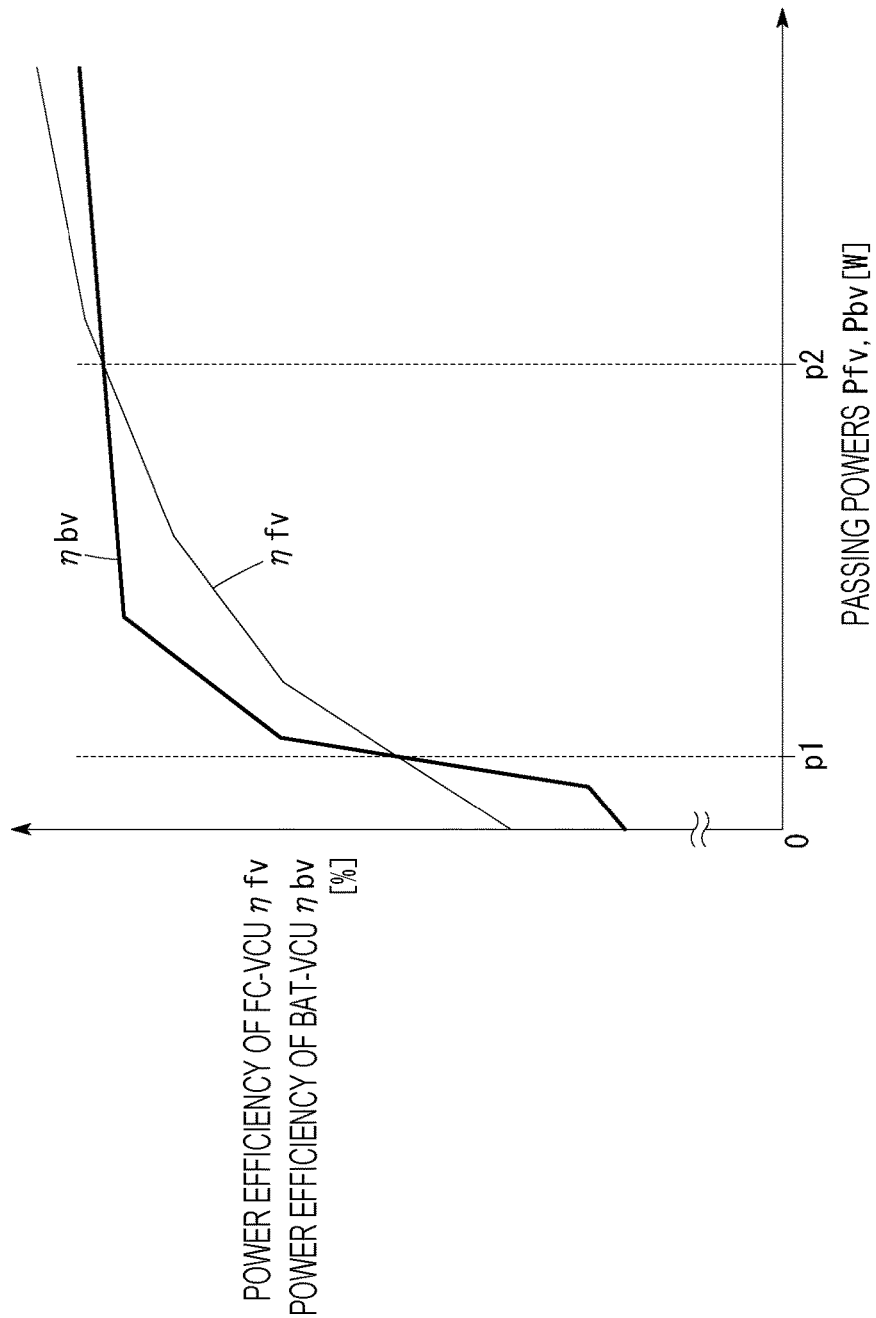

POWER SUPPLY SYSTEM

CROSS-REFERENCE TO RELATED APPLICATIONS

The present disclosure claims priority under 35 U.S.C. §119 to Japanese Patent Application No. 2016-045647, filed Mar. 9, 2016, entitled "Power Supply System." The contents of this application are incorporated herein by reference in their entirety.

BACKGROUND

1. Field

The present disclosure relates to a power supply system.

2. Description of the Related Art

Japanese Unexamined Patent Application Publication No. 2014-166103 describes a power system and a fuel cell vehicle, which are capable of improving energy efficiency or power efficiency as a whole (paragraph [0008], Abstract). To this end, Japanese Unexamined Patent Application Publication No. 2014-166103 (Abstract) describes that when load of a motor 14 is lower than a load threshold, a controller 30 of a FC vehicle 10 or a power system 12 stops step-up operation of a DC/DC converter 24 on an FC 50 side and causes the FC 50 to supply power to the motor 14. When load of the motor 14 is higher than the load threshold, the controller 30 causes the DC/DC converter 24 to perform step-up operation to change the load threshold depending on output voltage Vfc of the FC 50.

SUMMARY

According to one aspect of the present invention, a power supply system includes a first power supply, a second power supply, a first voltage converter, a second voltage converter, and circuitry. The first power supply and the second power supply electric power to a load. The first power supply is connected to the load via the first voltage converter to boost first output voltage output from the first power supply by switching a first switching element. The second power supply is connected to the load via second voltage converter to boost second output voltage output from the second power supply by switching a second switching element. The circuitry is configured to control the first voltage converter to boost the first output voltage when the first power supply and the second power supply the electric power to the load such that first passing power passing through the first voltage converter and second passing power passing through the second voltage converter are within a passing power range. Conversion efficiency of the first voltage converter is higher than conversion efficiency of the second voltage converter. A voltage range of the first output voltage is smaller than a voltage range of the second output voltage in a case where the first passing power and the second passing power are within the passing power range. The circuitry is configured to control the second voltage converter to stop boosting the second output voltage so as to supply the electric power from the second power supply directly to the load when the first power supply and the second power supply the electric power to the load such that the first passing power and the second passing power are within the passing power range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 illustrates power-voltage characteristics of the fuel cell and the battery according to the embodiment.

FIG. 12 illustrates an example of a power efficiency of the FC converter and the battery converter according to the modified example.

DESCRIPTION OF THE EMBODIMENTS

Figure 1:
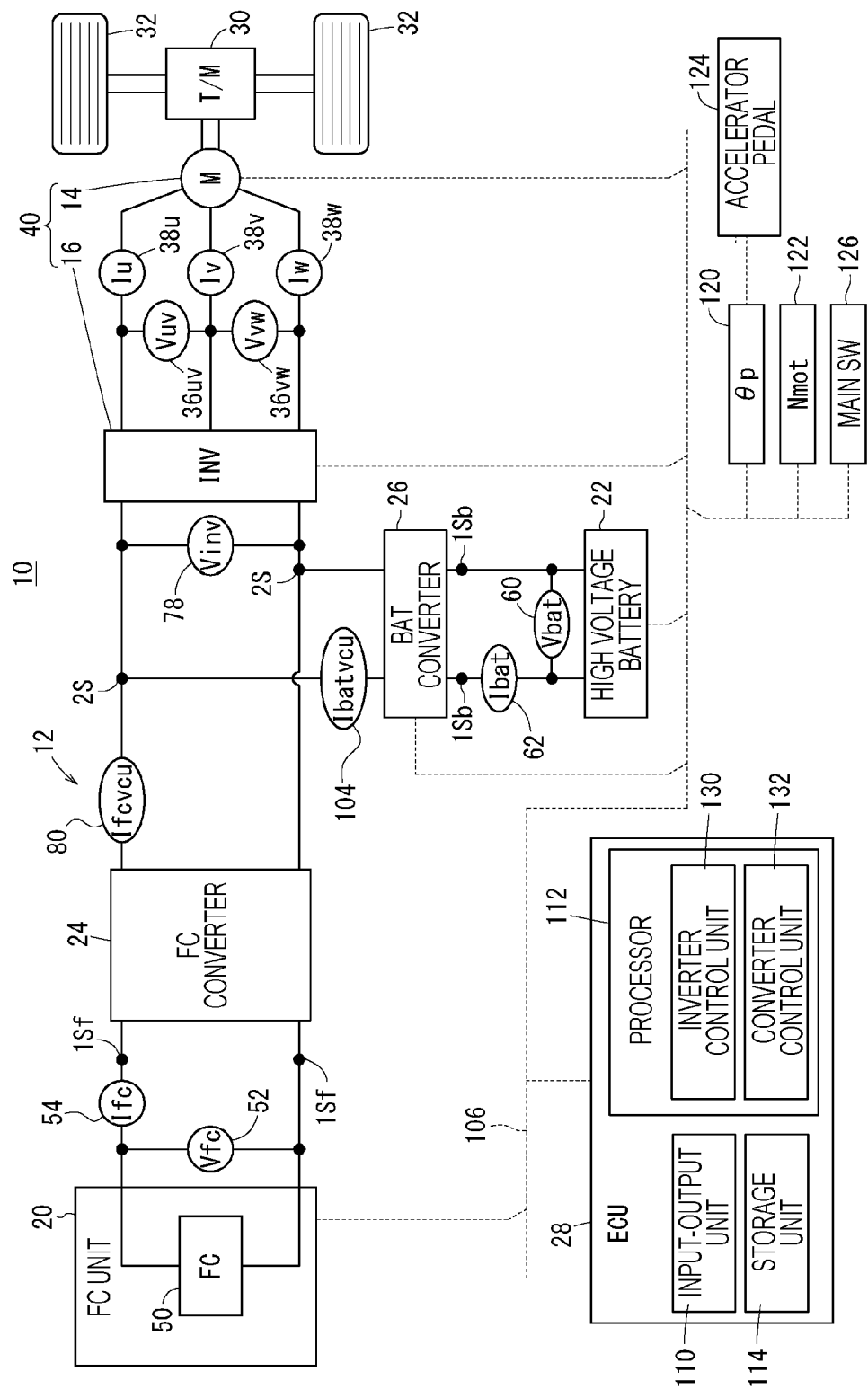
FIG. 1 is a schematic overall configuration view of a fuel cell vehicle in which a fuel cell system as a power supply system according to a first embodiment of the present disclosure is mounted.

The embodiments will now be described with reference to the accompanying drawings, wherein like reference numerals designate corresponding or identical elements throughout the various drawings.

A. Embodiment

<A-1. Configuration>
[A-1-1. Overall Configuration]

FIG. 1 is a schematic overall configuration view of a fuel cell vehicle 10 (hereinafter referred to as "FC vehicle 10" or "vehicle 10") in which a fuel cell system 12 (hereinafter referred to as "FC system 12" or "system 12") as a power supply system according to embodiment of the present disclosure is mounted. The FC vehicle 10 includes a drive motor 14 (hereinafter referred to as "motor 14") and an inverter 16 in addition to the FC system 12.

The FC system 12 (power supply system) includes a fuel cell unit 20 (hereinafter referred to as "FC unit 20"), a high voltage battery 22 (hereinafter also referred to as "battery 22"), a FC converter 24, a battery converter 26, and an electronic control unit 28 (hereinafter referred to as "ECU 28").

[A-1-2. Drive System]

The motor 14 according to the embodiment is of the three phase AC brushless type. The motor 14 is configured to generate a drive force based on a power supplied from the FC unit 20 and the battery 22 and rotate a wheel 32 by the drive force through a transmission 30. The motor 14 is also configured to output a power (regenerative power Preg) "W" generated by regeneration to the battery 22 and so on.

Voltage between U phase and V phase and between V phase and W phase of the motor 14 is detected by voltage sensors 36uv, 36vw. Currents of the phases (U phase, V phase, and W phase) of the motor 14 are detected by current sensors 38u, 38v, and 38w. Alternatively, current may be detected from only two phases out of the three phases, and current of the remaining one phase may be detected from those currents.

The inverter 16 has a three phase full bridge configuration and is configured to perform DC-to-AC conversion. More specifically, the inverter 16 is configured to convert DC to three phase AC and supply the AC to the motor 14, and supply DC subjected to AC-to-DC conversion following the regeneration to the battery 22 and so on through the battery converter 26. The motor 14 and the inverter 16 are collectively referred to as a load 40.

[A-1-3. FC Unit 20]

The FC unit 20 includes a fuel-cell stack 50 (hereinafter referred to as "FC stack 50", "fuel cell 50" or "FC 50") and peripheral parts thereof. The FC stack 50 (first power supply) has, for example, a configuration in which fuel cells formed by sandwiching a solid polymer electrolyte membrane between an anode electrode and a cathode electrode from both sides thereof are laminated. The peripheral parts include anode parts for supplying and discharging hydrogen (fuel gas) to the anode of the FC stack 50 and cathode parts for supplying and discharging air including oxygen (oxidizing agent gas) to the cathode of the FC stack 50.

Output voltage of the FC 50 (hereinafter referred to as "FC voltage Vfc") is detected by a voltage sensor 52. Output current of the FC 50 (hereinafter referred to as "FC current Ifc") is detected by a current sensor 54.

[A-1-4. High Voltage Battery 22]

The battery 22 (second power supply) is a storage device (energy storage) including multiple battery cells, for which, for example, a lithium ion secondary battery, a nickel hydrogen secondary battery, and so on may be used. A storage device such as the capacitor may be used in place of the battery 22.

Input/output voltage of the battery 22 (hereinafter referred to as "battery voltage Vbat" or "BAT voltage Vbat") [V] is detected by a voltage sensor 60. Input/output current of the battery 22 (hereinafter referred to as "battery current Ibat" or "BAT current Ibat") [A] is detected by a current sensor 62. The ECU 28 calculates the remaining capacity (SOC) [%] of the battery 22 based on the battery voltage Vbat and the battery current Ibat.

[A-1-5. FC Converter 24]

The FC converter 24 (first voltage converter) is a step-up chopper type voltage converter (DC/DC converter) configured to boost output voltage of the FC 50 (FC voltage Vfc) to the inverter 16. The FC converter 24 is disposed between the FC 50 and the inverter 16. In other words, the FC converter 24 is connected, at one side thereof, to a primary side 1Sf where the FC 50 is located, and at another side thereof, to a secondary side 2S where the battery 22 and the load 40 are connected therewith. Hereinafter, the FC converter 24 is referred to as a converter 24, a step-up converter 24, or a FC-VCU 24. The FC-VCU 24 means a voltage control unit for the FC 50.

Figure 2:
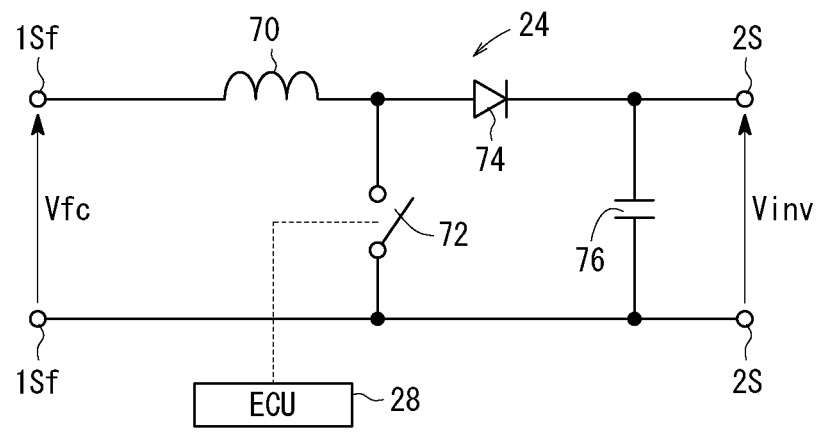
FIG. 2 is a schematic circuit diagram illustrating a configuration example of a FC converter according to the embodiment.

FIG. 2 is a schematic circuit diagram illustrating a configuration example of the FC converter 24 according to the embodiment. The FC-VCU 24 includes an inductor 70, a switching element 72, a diode 74, and a smoothing capacitor 76. The FC-VCU 24 boosts the FC voltage Vfc when the switching element 72 is switched (duty control) through the ECU 28. The boosted voltage turns input terminal voltage of the inverter 16 (hereinafter referred to as "inverter input terminal voltage Vinv" or "input terminal voltage Vinv"). The inverter input terminal voltage Vinv is detected by a voltage sensor 78 (FIG. 1). Output terminal current of the FC-VCU 24 (hereinafter referred to as "output terminal current Ifcvcu") is detected by a current sensor 80.

The switching element 72 (first switching element) of the embodiment includes, for example, the MOSFET (metal-oxide-semiconductor field-effect transistor). The MOSFET constituting the switching element 72 is, for example, made of SiC (silicon carbide).

[A-1-6. Battery Converter 26]

The battery converter 26 (second voltage converter) is a step-up chopper type voltage converter (DC/DC converter). The battery converter 26 supplies output voltage of the battery 22 (battery voltage Vbat) to the inverter 16 by boosting or in the directly coupled state. The battery converter 26 supplies regenerative voltage (hereinafter referred to as "regenerative voltage Vreg) of the motor 14 or the inverter input terminal voltage Vinv as the FC voltage Vfc to the battery 22 in the directly coupled state.

As illustrated in FIG. 1, the battery converter 26 is disposed between the battery 22 and the inverter 16. In other words, the battery converter 26 is connected, at one side thereof, to a primary side 1Sb where the battery 22 is located, and at another side thereof, to a secondary side 2S where the FC 50 and the load 40 are connected thereto. Hereinafter, the battery converter 26 is referred to as a converter 26, a BAT converter 26, a step-up converter 26, or a BAT-VCU 26. The BAT-VCU 26 means a voltage control unit for the battery 22.

Figure 3:
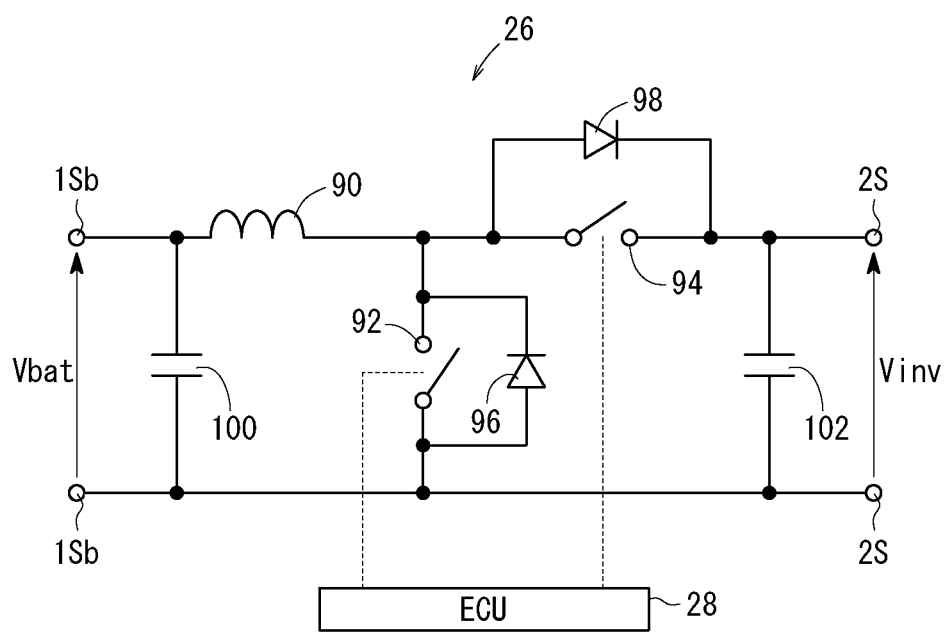
FIG. 3 is a schematic circuit diagram illustrating a configuration example of a battery converter according to the embodiment.

FIG. 3 is a schematic circuit diagram illustrating a configuration example of the battery converter 26 in the embodiment. The BAT-VCU 26 includes an inductor 90, switching elements 92, 94, diodes 96, 98 respectively coupled to the switching elements 92, 94 in parallel and smoothing capacitors 100, 102.

The switching elements 92, 94 (second switching elements) according to the embodiment include, for example, an insulated gate bipolar transistor (IGBT). The IGBT constituting the switching elements 92, 94 is, for example, made of silicon.

When boosting in the powering time using the battery 22, the switching element 94 is turned off and the switching element 92 is turned on by the ECU 28 (duty control) to boost the battery voltage Vbat. The boosted voltage turns the inverter input terminal voltage Vinv.

When directly connected the powering time by using the battery 22, the switching element 92 is turned off and the switching element 94 is turned on by the ECU 28 to supply the battery voltage Vbat to the inverter 16 as is. In other words, the battery voltage Vbat turns the inverter input terminal voltage Vinv.

During regeneration, the switching element 92 is turned off and the switching element 94 is turned on by the ECU 28 to supply the inverter input terminal voltage Vinv to the battery 22 as is. In other words, the battery voltage Vbat (input voltage to the battery 22) turns the inverter input terminal voltage Vinv.

As described above, the inverter input terminal voltage Vinv is detected by the voltage sensor 78 (FIG. 1). Output terminal current of the BAT-VCU 26 (hereinafter referred to as "output terminal current Ibatvcu") is detected by a current sensor 104.

In this embodiment, the FC-VCU 24 and the BAT-VCU 26 are controlled by the ECU 28 to control supply destination of a power supplied from the FC unit (hereinafter referred to as "FC power Pfc"), a power supplied from the battery 22 (hereinafter referred to as "battery power Pbat" or "BAT power Pbat") [W] and regenerative power Preg from the motor 14.

Hereinafter, the state where the BAT power Pbat, FC power Pfc or regenerative power Preg is supplied without boosting is referred to as "directly coupled state", and operation for achieving the directly coupled state is referred to as "directly coupling operation".

In the directly coupled state, boosting by the BAT-VCU 26 is not performed. Therefore, the inverter input terminal voltage Vinv is equal to the BAT voltage Vbat. More specifically, in the directly coupled state, the input terminal voltage Vinv is a value obtained by subtracting a voltage drop by the inductor 90 and diode 98 from the BAT voltage Vbat. Hereinafter, description is made on the basis that the input terminal voltage Vinv is substantially equal to the BAT voltage Vbat.

[A-1-7. ECU 28]

The ECU 28 is configured to control respective parts of the FC system 12 via a communication line 106 (FIG. 1). As illustrated in FIG. 1, the ECU 28 includes an Input-output unit 110, a processor 112 and a storage unit 114 as hardware.

The Input-output unit 110 is configured to perform input and output of the ECU 28. The Input-output unit 110 may include an analog-to-digital converter and a digital-to-analog converter. The processor 112 is configured to control the motor 14, inverter 16, FC unit 20, battery 22, and step-up converters 24, 26. To perform the control, the processor 112 executes a program stored in a storage unit. The processor 112 uses various sensors such as voltage sensors 52, 36uv, 36vw, 60, 78 and current sensors 38u, 38v, 38w, 54, 62, 80, 104.

The various sensors include an opening degree sensor 120 and a motor revolution sensor 122 (FIG. 1) in addition to the above-mentioned sensors. The opening degree sensor 120 detects the opening degree θp [degree] of an accelerator pedal 124. The motor revolution sensor 122 is configured to detect the revolution [rpm] of the motor 14 (hereinafter referred to as motor revolution Nmot" or "revolution Nmot"). The ECU 28 detects vehicle speed V [km/h] of the FC vehicle 10 by using the revolution Nmot. Further, the ECU 28 connects with a main switch 126 (hereinafter referred to as "main SW 126"). The main SW 126 is configured to select whether to supply power from the FC unit 20 and the battery 22 to the motor 14 and may be operated by the user.

The processor 112 includes a central processing unit (CPU). As illustrated in FIG. 1, the processor 112 includes an inverter control unit 130 configured to control the inverter 16 and a converter control unit 132 configured to control converters 24, 26.

The processor 112 determines a load Psys (hereinafter referred to as "system load Psys") required to the FC system 12 for the entire FC vehicle 10 based on the state of the FC stack 50, the state of battery 22 and the state of the motor 14 plus inputs (load requirements) from various switches and various sensors. Then, the processor 112 adjusts and determines allocation (share) of a load which the FC stack 50 should share, a load which the battery 22 should share, and a load which the regeneration power supply (motor 14) should share. Further, the processor 112 sends commands to the motor 14, inverter 16, FC unit 20, battery 22, and converters 24, 26. As basic controls by the processor 112 of the ECU 28, for example, controls disclosed by Japanese Unexamined Patent Application Publication No. 2014-166103 may be used.

The ECU 28 may be constituted by not only one ECU but also multiple ECUs for the motor 14, FC unit 20, battery 22, and converters 24, 26.

<A-2. Control>

Next, control of the FC converter 24 and battery converter 26 in the embodiment is described. For other controls, those disclosed by Japanese Unexamined Patent Application Publication No. 2014-166103 may be used.

[A-2-1. Basic Concept]

Figure 4:
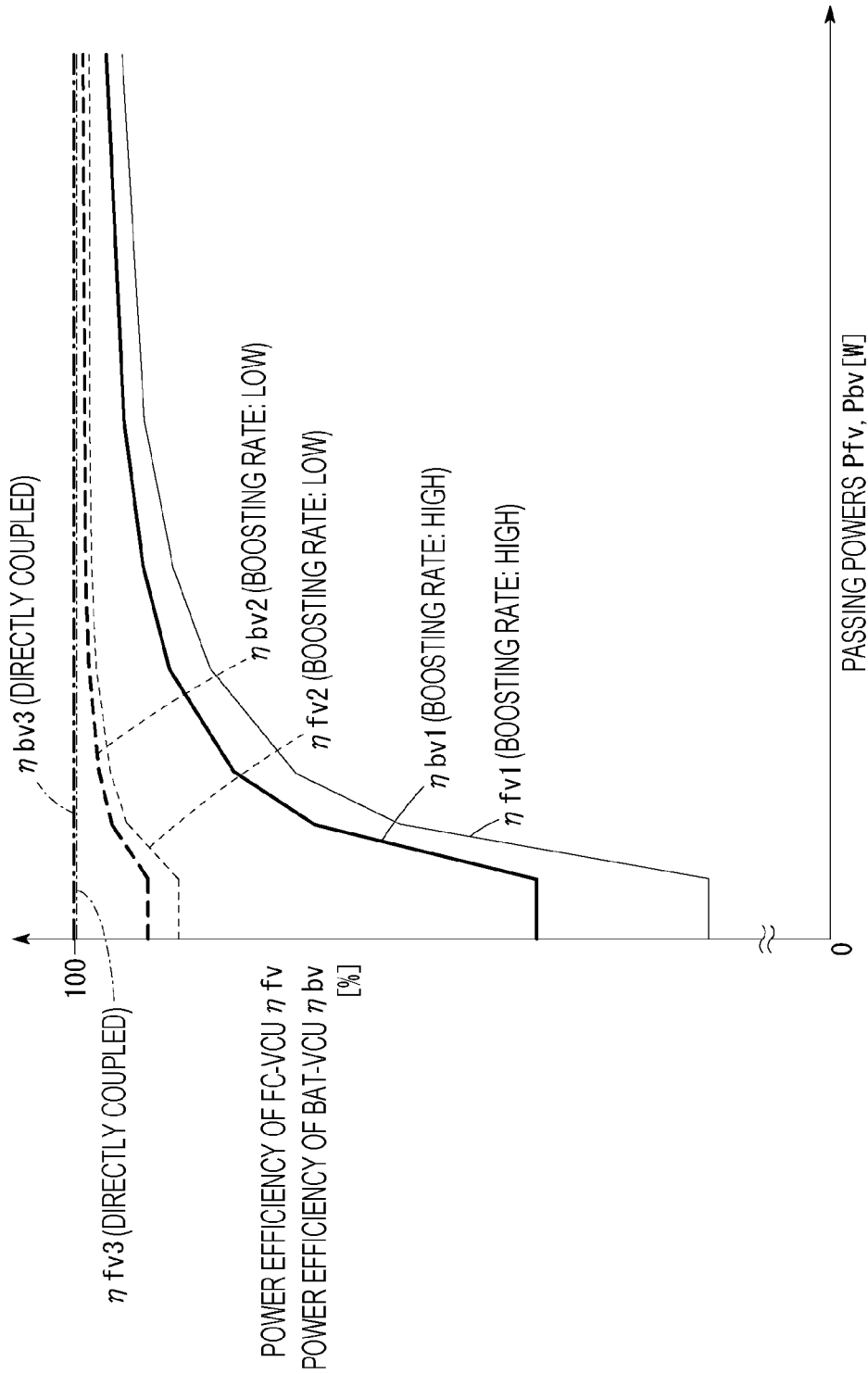
FIG. 4 illustrates an example of a power efficiency of the FC converter and the battery converter according to the embodiment.

FIG. 4 illustrates an example of a power efficiency ηfv, ηbv [%] of the FC converter 24 and the battery converter 26 in the embodiment. The power efficiency ηfv referred to herein (hereinafter also referred to as "FC-VCU efficiency ηfv") is an index indicating how much power loss (for conversion to heat or the like) may be reduced during transformation (boosting) by the FC-VCU 24. The FC-VCU efficiency ηfv is calculated from the ratio between an input power to the FC-VCU 24 and an output power from the FC-VCU 24. The FC-VCU efficiency ηfv varies according to the passing power Pfv that passes through the FC-VCU 24 and the boosting rate of the FC-VCU 24.

For example, FIG. 4 illustrates ηfv1, ηfv2, and ηfv3 as the FC-VCU efficiency ηfv. ηfv1 is the power efficiency ηfv when the boosting rate of the FC-VCU 24 is high. ηfv2 is the power efficiency ηfv when the boosting rate of the FC-VCU 24 is low. ηfv3 is the power efficiency ηfv when the FC-VCU 24 is in the directly coupled state. FIG. 4 demonstrates that the value of ηfv2 is higher than ηfv1 (less power loss). Also, the value of ηfv3 is higher than ηfv2 (less power loss).

Similarly, the power efficiency ηbv (hereinafter may be referred to as "BAT-VCU efficiency ηbv") is an index indicating how much power loss (for conversion to heat or the like) may be reduced during transformation (boosting) by the BAT-VCU 26. The BAT-VCU efficiency ηbv is calculated from the ratio between an input power to the BAT-VCU 26 and an output power from the BAT-VCU 26. The BAT-VCU efficiency ηbv varies according to the passing power Pbv that passes through the BAT-VCU 26 and the boosting rate of the BAT-VCU 26.

Similarly with power efficiencies ηfv1, ηfv2, and ηfv3, power efficiencies ηbv1, ηbv2, and ηbv3 of FIG. 4 correspond to the high boosting rate, low boosting rate and directly coupled state. Input power and boosting rate of power efficiencies ηfv1 and ηbv1 are the same, and input power and boosting rate of power efficiencies ηfv2 and ηbv2 are the same. As illustrated in FIG. 4, when the boosting rates are the same, the FC-VCU efficiency ηfv is higher (more excellent) than the BAT-VCU efficiency ηbv. Thus, in the embodiment, entire power efficiency ηtotal (hereinafter also referred to as "entire efficiency ηtotal") of the system 12 is improved by utilizing the directly coupled state of the battery converter 26 as much as possible.

Reason why the FC-VCU efficiency ηfv is more excellent than the BAT-VCU efficiency ηbv is, for example, as follows. More specifically, the switching element 72 of the FC converter 24 is a MOSFET made of SiC, while switching elements 92, 94 of the BAT converter 26 are IGBTs made of silicon.

[A-2-2. Power-Voltage Characteristics of FC 50 and Battery 22]

FIG. 5 illustrates power-voltage characteristics of the FC 50 and the battery 22 according to the embodiment. In FIG. 5, the FC voltage Vfc corresponds to the FC power Pfc, and the BAT voltage Vbat corresponds to the BAT power Pbat. The BAT voltage Vbat is shown respectively when SOC is high, middle and low. Vfc_ave is an average value of the FC voltage Vfc, and Vbat_ave is an average value of the BAT voltage Vbat.

Characteristics of FIG. 5 are an example of characteristics in the reference state. The reference state of the FC 50 referred to herein is, for example, a state where a reactant gas (fuel gas and oxidizing agent gas) sufficient for power generation is supplied to the FC 50 and temperature of the FC 50 (FC temperature Tfc) is normal temperature (for example, 20° C.). The reference state of the battery 22 is a state where the remaining capacity (SOC) of the battery 22 is a predetermined value (for example, 100% indicating full charging) and temperature of the battery 22 (battery temperature Tbat) is normal temperature.

As described above, in the embodiment, the directly coupled state of the battery converter 26 with low power efficiency is utilized as much as possible. For this reason, the battery voltage Vbat is set higher in the embodiment. Specifically, as illustrated in FIG. 5, the voltage range in which the FC 50 (first power supply) is capable of outputting is lower than the voltage range in which the battery 22 (second power supply) is capable of outputting, in any of operation ranges (predetermined passing power range) where the FC 50 and the battery 22 supply the power. In other words, the FC 50 and the battery 22 are designed so as to satisfy characteristics of FIG. 5 as specifications of the FC 50 and the battery 22.

As described later, the battery voltage Vbat is assumed to be a value higher than minimum value of the required motor voltage Vmot_req (or may be the same as the minimum value). For this reason, even when the battery enters the directly coupled state, the required motor voltage Vmot_req may be satisfied.

[A-2-3. Control of FC Converter 24 and Battery Converter 26 by ECU 28 (Converter Control Unit 132)]

(A-2-3-1. General Description)

Figure 6A:
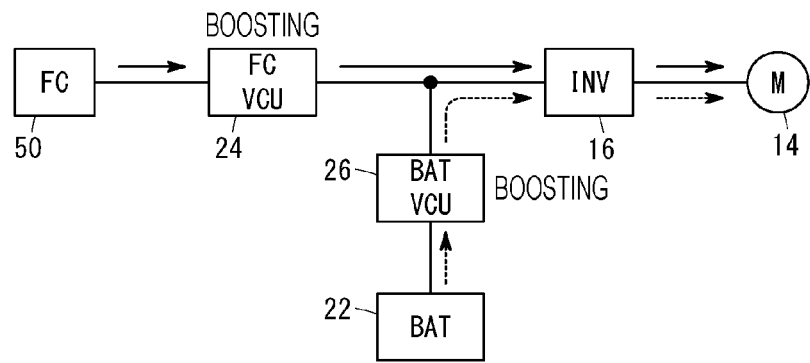
FIGS. 6A, 6B, and 6C are a first diagram, a second diagram and a third diagram respectively for illustrating control (operation mode) of the FC converter and the battery converter according to the embodiment.
Figure 6B:
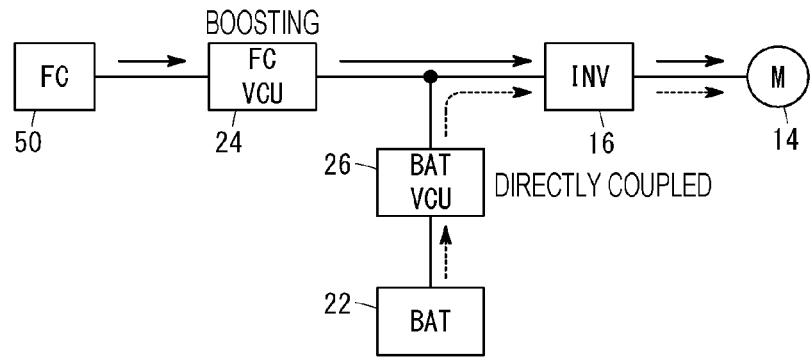
Figure 6C:
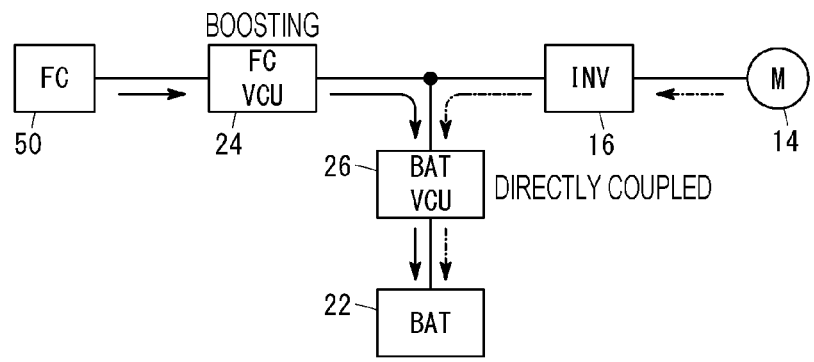

FIGS. 6A, 6B, and 6C are a first diagram, a second diagram and a third diagram respectively for illustrating control (or operation mode) of the FC converter 24 and the battery converter 26 in the embodiment. As illustrated in Table 1, FIGS. 6A, 6B, and 6C, three operation modes 1 to 3 are mainly used in the embodiment to control converters 24, 26. Solid line arrows in FIGS. 6A to 6C indicate current from the FC 50. Broken line arrows in FIGS. 6A and 6B indicate current from the battery 22. The single dot chain line arrow in FIG. 6C indicates regenerative current from the motor 14. Further details of operation modes 1 to 3 are described later with reference to FIG. 7.

TABLE 1

| | APPLIED CONDITION | FC CONVERTER | BAT CONVERTER |
|---|---|---|---|
| OPERATION MODE 1 | POWERING TIME IN HIGH LOAD STATE (SUCH AS SUDDEN ACCELERATION, HIGH SPEED CRUISE) | BOOSTING | BOOSTING |
| OPERATION MODE 2 | POWERING TIME IN LOW LOAD STATE (SUCH AS SLOW ACCELERATION, LOW AND HIGH SPEED CRUISES) | BOOSTING | DIRECTLY COUPLED |
| OPERATION MODE 3 | REGENERATING | BOOSTING | DIRECTLY COUPLED |

(A-2-3-2. Specific Flow)

Figure 7:
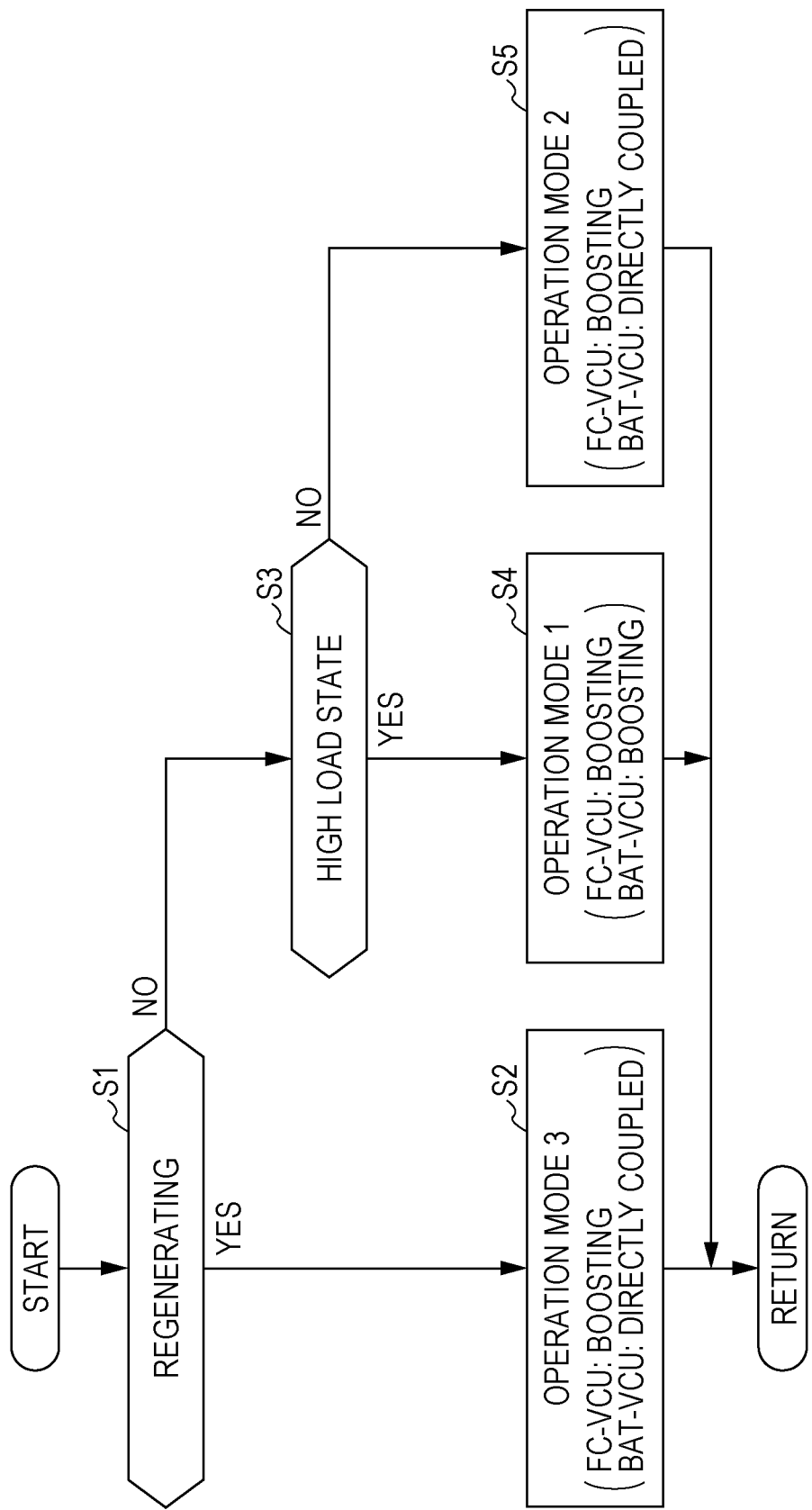
FIG. 7 is a flowchart of control of the FC converter and the battery converter according to the embodiment.

FIG. 7 is a flowchart of control of the FC converter 24 and the battery converter 26 in the embodiment. Control of FIG. 7 is performed by the converter control unit 132 of the ECU 28. In the step S1 of FIG. 7, the ECU 28 determines whether the motor 14 is regenerating.

If the motor is regenerating (S1: YES), in the step S2, the ECU 28 selects the operation mode 3 (FIG. 6C) which causes the FC converter 24 to perform step-up operation and puts the battery converter 26 in the directly coupled state.

Specifically, the ECU 28, for example, turns on the switching element 72 (FIG. 2) of the FC-VCU 24 such that the FC voltage Vfc becomes the target FC voltage Vfc_tar. The target FC voltage Vfc_tar referred to here is, for example, a value which suppresses deterioration of the FC 50. Alternatively, the target FC voltage Vfc_tar corresponding to the target FC current Ifc_tar based on the SOC of the battery 22 may be set based on current-voltage characteristics of the FC 50.

The ECU 28 causes the BAT-VCU 26 to perform direct coupling operation by outputting a drive signal to the switching element 94 (FIG. 3) of the BAT-VCU 26.

Back to the step S1, if the motor is not regenerating (S1: NO), in the step S3, the ECU 28 determines whether the motor 14 is in a high load state (in other words, whether output of the motor 14 is in the high load region). The high load state (high load region) is described later with reference to FIG. 8.

If the motor is in the high load state (S3: YES), in the step S4, the ECU 28 selects the operation mode 1 (FIG. 6A) which causes both the FC converter 24 and the battery converter 26 to perform step-up operation.

For example, the ECU 28 sets the boosting rate (drive duty) of converters 24, 26 such that output voltage Vfcvcu of the FC-VCU 24 and output voltage Vbatvcu of the BAT-VCU become the required motor voltage Vmot_req. Alternatively, considering a voltage drop in the inverter 16, the ECU 28 may control output voltages Vfcvcu, Vbatvcu so as to be slightly higher than the required motor voltage Vmot_req. At that time, the inverter control unit 130 drives respective switching elements (not shown) of the inverter 16 at the maximum duty ratio. Thus, input voltage equal to the required motor voltage Vmot_req is applied to the motor 14. The required motor voltage Vmot_req is described later with reference to FIG. 8.

The output voltage Vfcvcu of the FC-VCU 24 may be calculated based on the inverter input terminal voltage Vinv and output terminal current Ifcvcu. Alternatively, the output voltage Vfcvcu may be detected from another voltage sensor at the outlet side of the FC-VCU 24. In the same manner, the output voltage Vbatvcu of the BAT-VCU 26 may be calculated based on the inverter input terminal voltage Vinv and output terminal current Ibatvcu. Alternatively, the output voltage Vbatvcu may be detected from another voltage sensor at the outlet side of the BAT-VCU 26.

If the motor 14 is not in the high load state (S3: NO), in the step S5, the ECU 28 selects the operation mode 2 (FIG. 6B) which causes the FC converter 24 to perform step-up operation and puts the battery converter 26 in the directly coupled state.

For example, the ECU 28 sets the boosting rate (drive duty) of the FC-VCU 24 such that output voltage Vfcvcu of the FC-VCU 24 becomes equal to the output voltage Vbatvcu of the BAT-VCU 26. At that time, the inverter control unit 130 performs feedback control by controlling the duty ratio of respective switching elements of the inverter 16 such that input voltage (average value in a predetermined period of time) to the motor 14 becomes equal to the required motor voltage Vmot_req. Thus, input voltage equal to the required motor voltage Vmot_req is applied to the motor 14.

The ECU 28 puts the BAT-VCU 26 in the directly coupled state by outputting the drive signal to the switching element 94 (FIG. 3) of the BAT-VCU 26. Alternatively, the BAT-VCU 26 may enter the directly coupled state by supplying current via the diode 98 without outputting the drive signal to the switching element 94.

(A-2-3-3. High Load Region and Low Load Region of Motor Output and Required Motor Voltage Vmot_Req)

Figure 8:
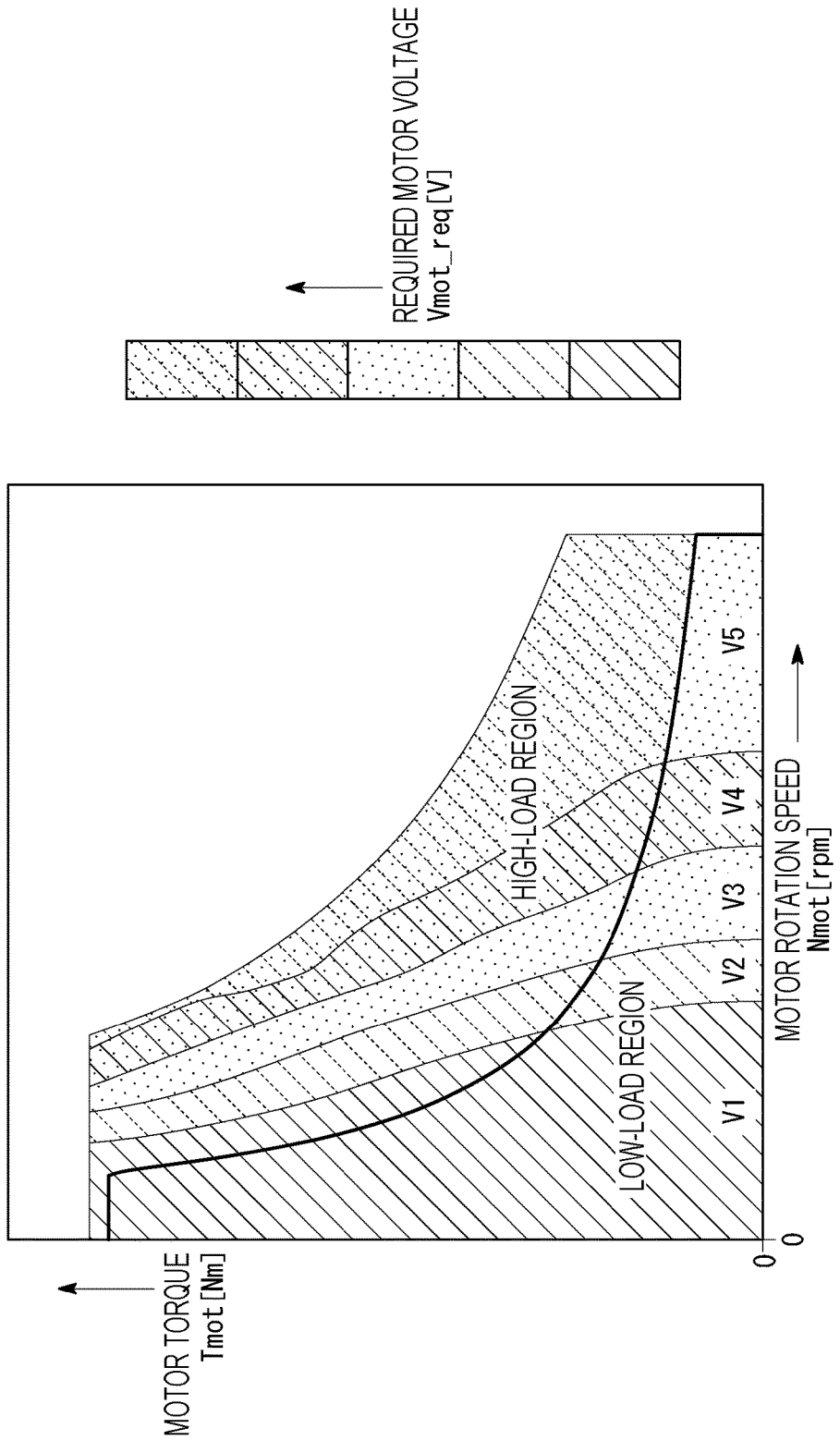
FIG. 8 is a diagram for illustrating a high load region, a low load region and a required motor voltage of the motor output according to the embodiment.

FIG. 8 is a diagram for illustrating the high load region, the low load region and the required motor voltage Vmot_req of the motor output in the embodiment. In FIG. 8, the vertical axis represents the motor torque Tmot, and the horizontal axis represents the motor revolution Nmot. As illustrated in FIG. 8, in the embodiment, the high load region and the low load region are segmented on the basis of the motor revolution Nmot and the motor torque Tmot. For this purpose, the ECU 28 prestores a map indicating characteristics illustrated in FIG. 8 into the storage unit 114 and determines on the basis of the motor revolution Nmot and the motor torque Tmot whether the motor 14 is in the high load state.

In the embodiment, the high load region and the low load region are segmented by considering power loss Lmot of the motor 14 (hereinafter also referred to as "motor loss Lmot") and the power loss Linv of the inverter 16 (hereinafter also referred to as "inverter loss Linv") in addition to the power efficiency ηfv of the FC converter 24 and the power efficiency ηbv of the battery converter 26 (FIG. 4) (details are described later with reference to FIG. 9).

Further, as illustrated in FIG. 8, the required motor voltage Vmot_req varies in a stepwise manner according to the motor revolution Nmot and the motor torque Tmot. In FIG. 8, five step voltages V1 to V5 are illustrated. However, the number of steps may be decreased or increased.

As described above, the battery voltage Vbat is applied to the inverter 16 as is by putting the battery converter 26 in the directly coupled state. Thus, the battery voltage Vbat is set to at least a value equal to or higher than V1 (minimum value of required motor voltage Vmot_req). Thus, in a predetermined reference state, the average value Vbat_ave (FIG. 5) of the battery voltage Vbat is set, for example, so as to be V3. However, the average value Vbat_ave may be set to another value (any of V1, V2, V4, and V5).

Figure 9:
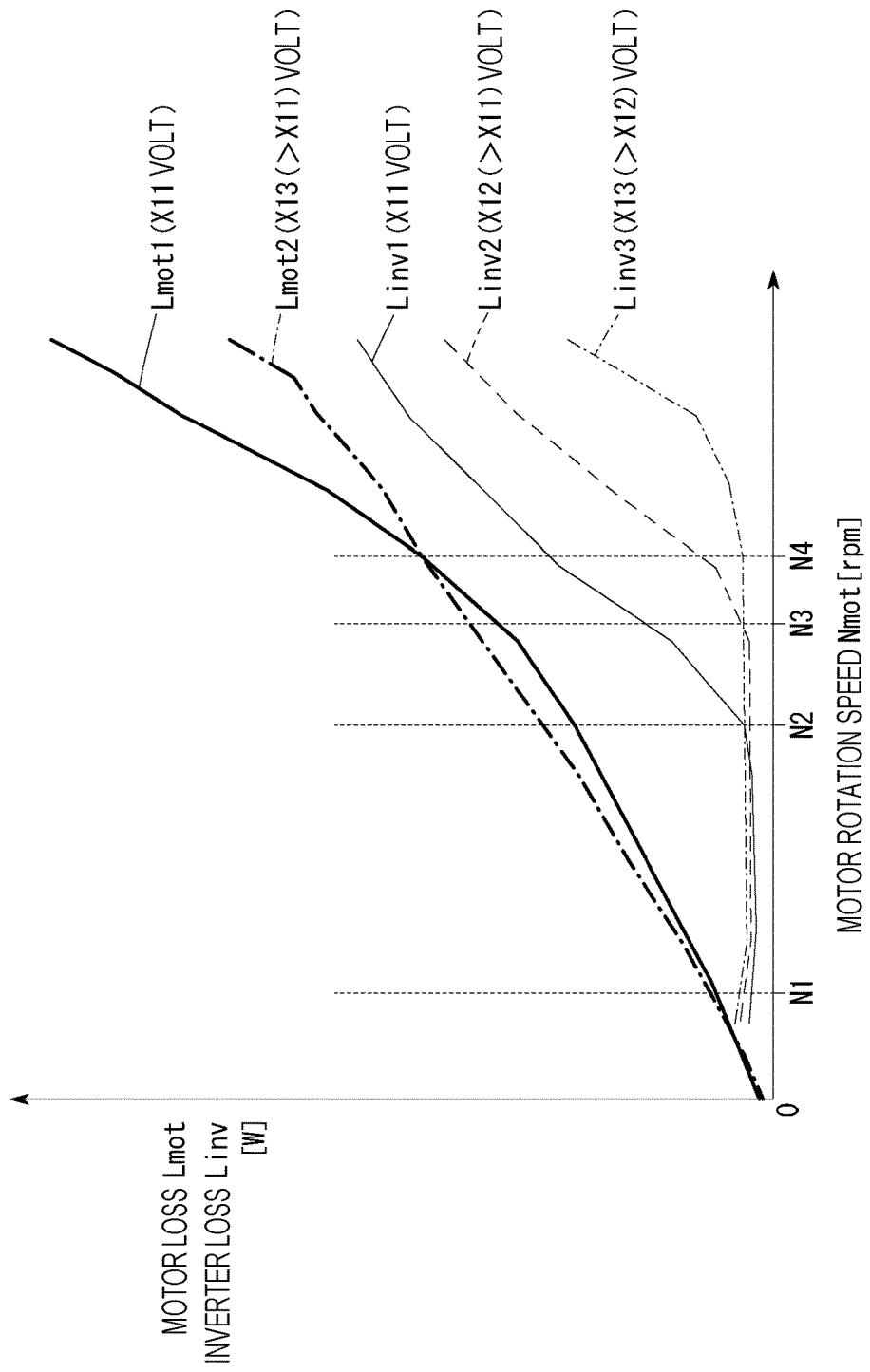
FIG. 9 illustrates an example of a power loss of the motor and inverter according to the embodiment.

FIG. 9 illustrates an example of the power loss Lmot of the motor 14 and the power loss Linv of the inverter 16 in the embodiment. In FIG. 9, the horizontal axis represents the motor revolution Nmot, and the vertical axis represents the motor loss Lmot and the inverter loss Linv. The motor loss Lmot is an index indicating how much power loss (for conversion to heat and so on) is caused by the motor 14 when rotating. The inverter loss Linv is an index indicating how much power loss (for conversion to heat and so on) is caused by the inverter 16 when the motor 14 rotates. The motor loss Lmot and the inverter loss Linv vary according to the motor revolution Nmot and respective input voltages to the motor 14 and the inverter 16.

For example, FIG. 9 illustrates Lmot1 and Lmot2 as the motor loss Lmot. Lmot1 is the motor loss Lmot when input voltage to the motor 14 is X11 V. Lmot2 is the motor loss Lmot when input voltage to the motor 14 is X13 V (>X11). X13 V is higher than X11 V.

In FIG. 9, when the motor revolution Nmot is a value of 0 to N1, the motor power losses Lmot1, Lmot2 are almost the same. When the motor revolution Nmot is a value of N1 to N4, the motor power loss Lmot2 is higher (more inferior) than the motor power loss Lmot1. When the motor revolution Nmot is equal to or higher than N4, the motor power loss Lmot1 is higher (more inferior) than the motor power loss Lmot2.

Similarly, FIG. 9 illustrates Linv1, Linv2 and Linv3 as inverter losses Linv. Linv1 is the inverter loss Linv when input voltage to the inverter 16 is X11 V. Linv2 is the inverter loss Linv when input voltage to the inverter 16 is X12 V (>X11). Linv3 is the inverter loss Linv when input voltage to the inverter 16 is X13 V (>X12). X12 V is higher than X11 V, and X13 V is higher than X12 V.

In FIG. 9, when the motor revolution Nmot is a value of N1 to N2, the inverter power losses Linv1, Linv2 and Linv3 are almost the same. When the motor revolution Nmot is a value of N2 to N3, the inverter power loss Linv1 is higher (more inferior) than inverter power losses Linv2, Linv3. When the motor revolution Nmot is equal to or higher than N3, the inverter power loss Linv2 is higher (more inferior) than inverter power loss Linv3.

In consideration of the above, the ECU 28 segments the high load region and the low load region of FIG. 8 based on the power efficiency ηfv of the FC converter 24 and the power efficiency ηbv of the battery converter 26 (FIG. 4) as well as the motor loss Lmot and the inverter loss Linv such that the power loss of the FC system as a whole ("hereinafter referred to as "total power loss Ltotal") is reduced. When calculating the total power loss Ltotal, the ECU 28 calculates power losses corresponding to power efficiencies ηfv, ηbv.

[A-2-4. Example of Control of FC Converter 24 and Battery Converter 26]

Figure 10:
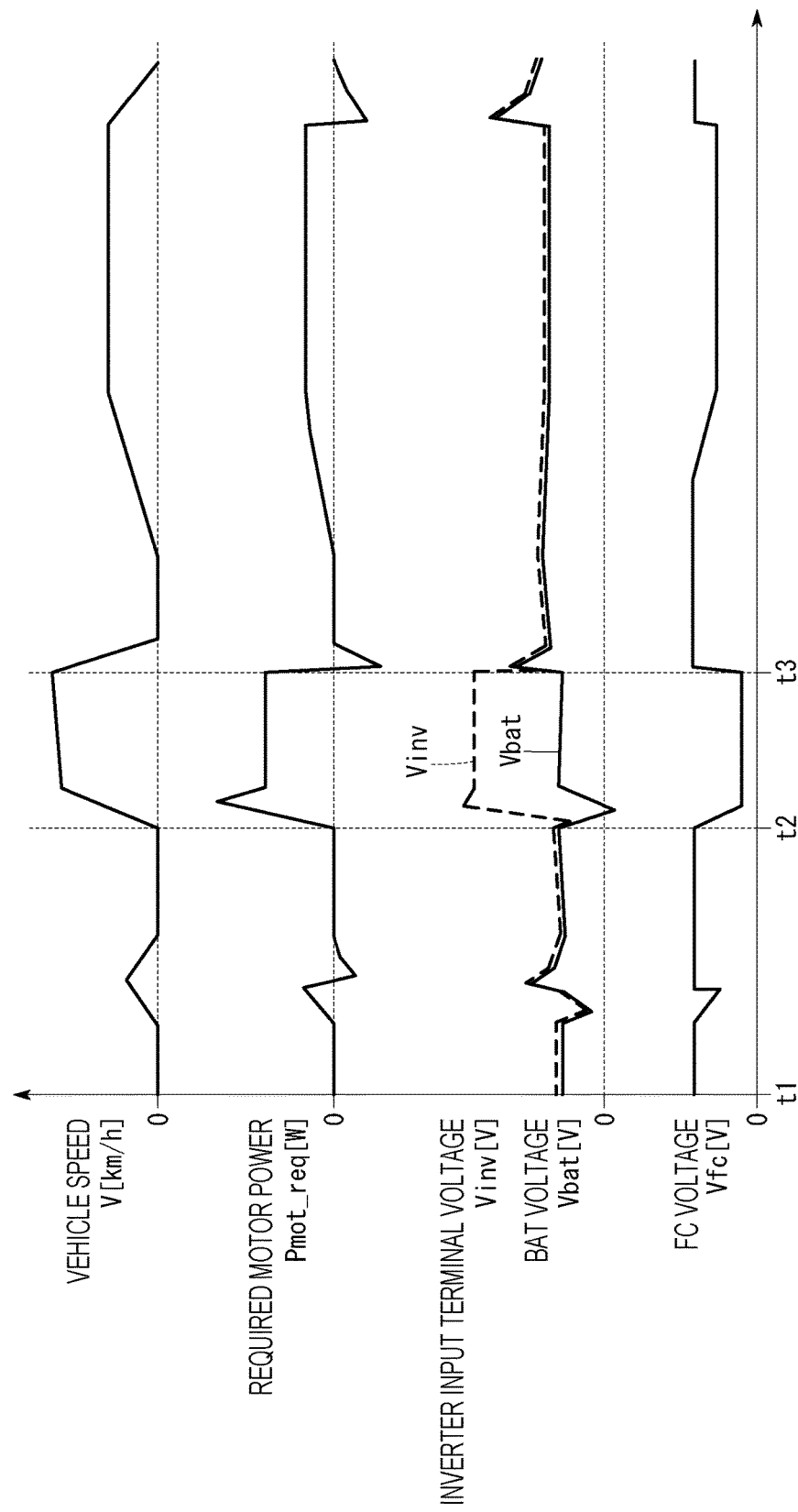
FIG. 10 is a time chart illustrating an example of control of the FC converter and the battery converter according to the embodiment.

FIG. 10 is a time chart illustrating an example of control of the FC converter 24 and the battery converter 26 in the embodiment. In FIG. 10, the vertical axis represents the required motor power Pmot_req, inverter input terminal voltage Vinv, BAT voltage Vbat and FC voltage Vfc, and the horizontal axis represents the time.

During the time period from t1 to t2 of FIG. 10, the operation mode 2 (S5 of FIG. 7) is selected, the BAT-VCU 26 enters the directly coupled state, and BAT voltage Vbat and input terminal voltage Vinv are equal to each other. The FC-VCU 24 performs step-up operation according to the required motor voltage Vmot_req.

When the required motor power Pmot_req increases sharply from the time t2, the operation mode is switched to the operation mode 1 (S4 of FIG. 7). Along with this, the BAT-VCU 26 starts boosting, and consequently the input terminal voltage Vinv becomes higher than the BAT voltage Vbat. Even at that time, the FC-VCU 24 continues step-up operation.

When the required motor power Pmot_req decreases from the time t3, the operation mode is switched to the operation mode 2 (S5 of FIG. 7), and the BAT-VCU 26 is returned into the directly coupled state. Then, after regeneration (S2) of the operation mode 3, the operation mode is switched to the operation mode 2.

<A-3. Effects of this Embodiment>

As illustrated above, according to the embodiment, when passing powers Pfv, Pbv are positive values (in other words, within a predetermined power range), the conversion efficiency ηfv of the FC converter 24 (first voltage converter) is higher than the conversion efficiency ηbv of the battery converter 26 (second voltage converter), for both of the passing powers, Pfv, Pbv (FIG. 4). When passing powers Pfv, Pbv are positive values, the voltage range in which the FC 50 (first power supply) is capable of outputting is lower than the voltage range in which the battery 22 (second power supply) is capable of outputting, for both of the passing powers Pfv, Pbv (FIG. 5). With the above preconditions satisfied, when supplying power from the FC 50 and the battery 22 to the load 40 with passing powers Pfv, Pbv being positive values, the ECU 28 causes the FC converter 24 to perform step-up operation and puts the battery converter 26 in the directly coupled state (FIG. 6B, S5 of FIG. 7).

Thus, power loss by the battery converter 26 may be suppressed by positively using the combination of the directly coupled state by the battery converter 26 having low conversion efficiency and the step-up operation by the FC converter 24 having high conversion efficiency, and thereby power efficiency ηtotal (or energy efficiency) of the power supply system 12 as a whole may be improved.

In the embodiment, the switching element 72 (first switching element) of the FC converter 24 has a smaller switching loss or a smaller conduction loss than switching elements 92, 94 (second switching elements) of the battery converter 26. Thus, when the FC 50 (first power supply) is used as a main power supply, power efficiency ηtotal of the entire power supply system 12 may be improved.

In the embodiment, when supplying power from the FC 50 (first power supply) and the battery 22 (second power supply) to the load 40, the ECU 28 (controller) causes the FC converter 24 (first voltage converter) to perform step-up operation and switches the battery converter 26 (second voltage converter) to the directly coupled state or the step-up operation depending on the system load Psys (required output of load 40) (FIGS. 6A and 6B, S4, S5 of FIG. 7). Thus, by using the directly coupled state of the battery converter 26 with priority and using step-up operation of the battery converter 26 when increasing the system load Psys, variation of the system load Psys may be responded flexibly.

In the embodiment, the load 40 includes an AC motor 14 (rotating electric machine) (FIG. 1). The power supply system 12 includes an inverter 16 that converts direct current from at least one of the FC 50 (first power supply) and the battery 22 (second power supply) to alternate current and supplies to the motor 14 (FIG. 1). Further, when a total value of power losses respectively of the motor 14, the inverter 16, the FC converter 24, and the battery converter 26 in a case where required motor voltage (required input voltage of the motor 14) is a specific value is defined as the total power loss, the ECU 28 (controller) causes the battery converter 26 to enter the directly coupled state if the total power loss becomes lower by causing the battery converter 26 to enter the directly coupled state than by causing to perform the step-up operation (FIGS. 4 and 9).

Thus, the ECU 28 determines in consideration of the total power loss whether to cause the battery converter 26 to enter the directly coupled state or to perform step-up operation, and thereby drop of power efficiency of the power supply system 12 as a whole may be suppressed in an effective manner.

In the embodiment, when supplying power from the FC 50 (first power supply) and the battery 22 (second power supply) to the load 40 for a predetermined period of time, the ECU 28 (controller) causes the FC converter 24 (first voltage converter) to continuously perform step-up operation and switches the battery converter 26 (second voltage converter) to the directly coupled state or the step-up operation depending on the system load Psys (required output of load 40) (FIGS. 6A and 6B, S4, S5 of FIG. 7, and FIG. 10). Thus, by using the directly coupled state of the battery converter 26 with priority while the FC converter 24 continues step-up operation for a predetermined period of time, and using step-up operation of the battery converter 26 when increasing the system load Psys, variation of the system load Psys may be responded flexibly.

In the embodiment, irrespective of values of the FC power Pfc and the BAT power Pbat, the FC voltage Vfc is higher than the BAT voltage Vbat (FIG. 5). In other words, the lower limit value of the FC voltage Vfc is higher than the upper limit value of the BAT voltage Vbat. Thus, even when the passing power Pfv of the FC-VCU 24 and the passing power Pbv of the BAT-VCU 26 vary, the FC-VCU efficiency ηfv is readily higher than the BAT-VCU efficiency ηbv (FIG. 4). This eliminates necessity of comparing power efficiencies ηfv and ηbv while the FC-VCU 24 and the BAT-VCU 26 are in operation, and thereby control of the FC-VCU 24 and BAT-VCU 26 may be simplified.

B. Modified Example

It is obvious that the present disclosure is not limited to the above embodiment, but may adopt various configurations based on the specification described herein. For example, the following examples may be adopted.

<B-1. Mounted System>

In the above embodiment, the FC system 12 is mounted in the FC vehicle 10 (FIG. 1). However, it is not limited thereto, for example, from the viewpoint that the directly coupled state of the battery converter 26 is utilized with priority. For example, the FC system 12 may be used in a moving object such as the vessel and aircraft. Alternatively, the FC system 12 may be applied to robots, manufacturing apparatuses, home power systems or household electric products.

<B-2. Configuration of FC System 12>

[B-2-1. Motor 14]

In the above embodiment, the motor 14 is of the AC type (FIG. 1). However, the motor 14 may be of the DC type from the viewpoint that the directly coupled state of the battery converter 26 is utilized with priority. In this case, the inverter 16 may be omitted.

In the above embodiment, the motor 14 is used for traveling or driving of the FC vehicle 10 (FIG. 1). However, it is not limited thereto, for example, from the viewpoint that the directly coupled state of the battery converter 26 is utilized with priority. For example, the motor 14 may be used for vehicle-mounted devices (for example, electric power steering, air compressor, and air conditioner).

[B-2-2. FC 50 (First Power Supply) and Battery 22 (Second Power Supply)]

In the above embodiment, the FC 50 and the battery 22 are used as the combination of multiple power supplies (FIG. 1). However, it is not limited thereto from the viewpoint that when providing a voltage converter in correspondence to each of multiple power supplies, a voltage converter of poor power conversion efficiency enters the directly coupled state with priority. For example, the present disclosure also may apply to the combination of two batteries or the combination of the battery and the capacitor.

In the above embodiment, in operation ranges (predetermined passing power ranges) where the FC 50 and the battery 22 supply the power, the upper limit value of the voltage range in which the FC 50 (first power supply) is capable of outputting is lower than the lower limit value of the voltage range in which the battery 22 (second power supply) is capable of outputting. However, it is not limited thereto, for example, from the viewpoint that the directly coupled state of the battery converter 26 is utilized with priority.

Figure 11:
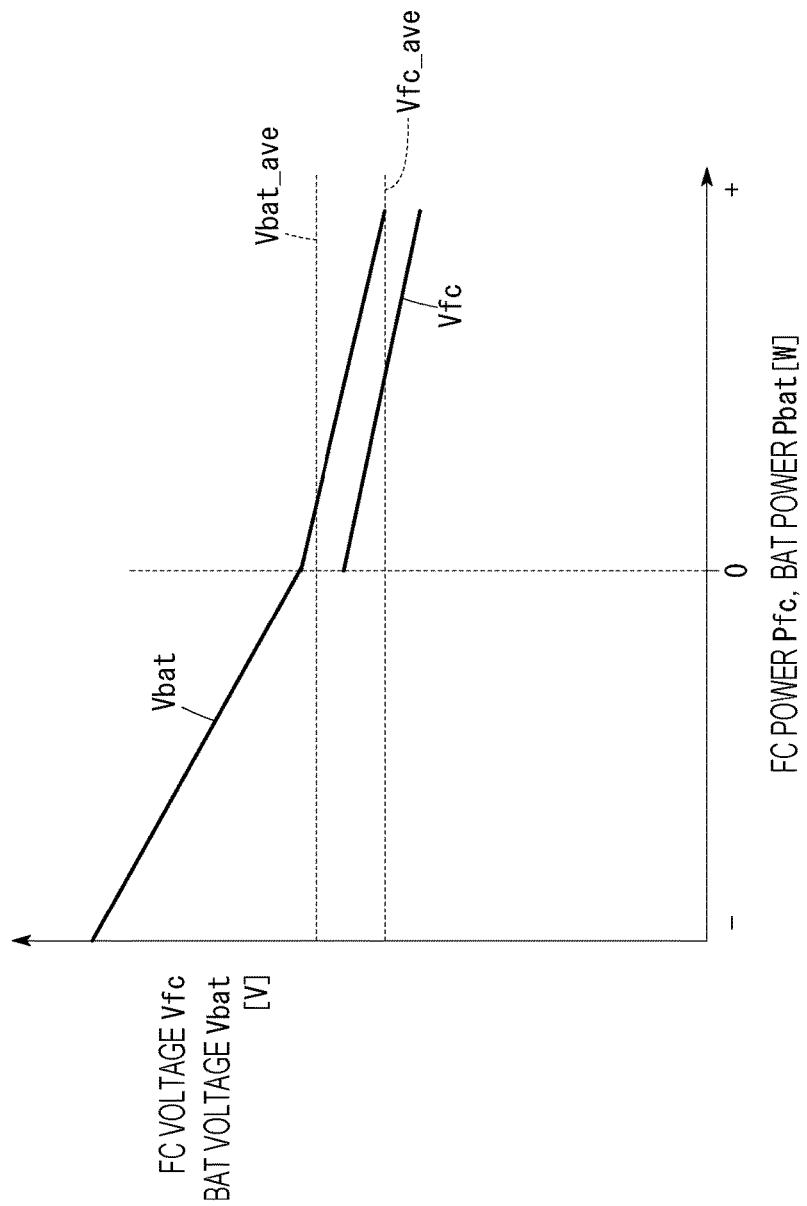
FIG. 11 illustrates power-voltage characteristics of the fuel cell and the battery according to a modified example.

FIG. 11 illustrates power-voltage characteristics of the FC 50 and the battery 22 according to a modified example. In FIG. 11, the FC voltage Vfc corresponds to the FC power Pfc, and the BAT voltage Pbat corresponds to the BAT power Pbat. Characteristics of FIG. 11 are characteristics in the reference state similarly with characteristics of FIG. 5. Vfc_ave is an average value of the FC voltage Vfc, and Vbat_ave is an average value of the BAT voltage Vbat.

In the characteristics of FIG. 11, the voltage range in which the FC 50 (first power supply) is capable of outputting is lower than the voltage range in which the battery 22 (second power supply) is capable of outputting, in any of operation ranges (predetermined passing power range) where the FC 50 and the battery 22 supply the power. In other words, the FC 50 and the battery 22 are designed so as to satisfy the characteristics of FIG. 11 as specifications of the FC 50 and the battery 22.

However, unlike the characteristics of FIG. 5, in the characteristics of FIG. 11, the upper limit value of the voltage range in which the FC 50 is capable of outputting is lower than the lower limit value of the voltage range in which the battery 22 (second power supply) is capable of outputting, in operation ranges (predetermined passing power ranges) where the FC 50 and the battery 22 supply the power. The present disclosure may apply to the FC 50 and the battery having such characteristics as illustrated in FIG. 11.

[B-2-3. FC Converter 24 (First Power Converter) and Battery Converter 26 (Second Power Converter)]

In the above embodiment, the step-up converter 24 is disposed upstream of the FC 50 (FIG. 1). However, it is not limited thereto, for example, from the viewpoint that the directly coupled state of the battery converter 26 is utilized with priority. For example, in place of the step-up converter 24, a step-up/step-down converter capable of stepping up and down the FC voltage Vfc or a step-down converter capable of stepping down the FC voltage may be disposed.

In the above embodiment, the step-up converter 26 is disposed upstream of the battery 22 (FIG. 1). However, it is not limited thereto, for example, from the viewpoint that the directly coupled state of the battery converter 26 is utilized with priority. For example, in place of the step-up converter 26, a step-up/step-down converter capable of stepping up the BAT voltage Vbat and stepping down the regenerative voltage Vreg or the FC voltage Vfc may be used. Alternatively, a step-up converter capable of stepping up the BAT voltage Vbat and stepping up the regenerative voltage Vreg or the FC voltage Vfc may be used.

In the above embodiment, irrespective of values of passing powers Pfv and Pbv, the power efficiency ηfv of the FC-VCU 24 is higher than the power efficiency ηbv of the BAT-VCU 26. However, it is not limited thereto, for example, from the viewpoint that the directly coupled state of the voltage converter 26 having inferior conversion efficiency is utilized with priority.

FIG. 12 illustrates an example of the power efficiency ηfv of the FC converter 24 and the power efficiency ηbv of the battery converter 26 according to the modified example. In the example of FIG. 12, when passing powers Pfv and Pbv are in the range from zero to p1 and equal to or higher than p2, the power efficiency ηfv of the FC-VCU 24 is higher than the power efficiency ηbv of the BAT-VCU 26. On the other hand, when passing powers Pfv and Pbv are in the range from p1 to p2, the power efficiency ηbv of the BAT-VCU 26 is higher than the power efficiency ηfv of the FC-VCU 24.

Thus, the ECU 28 may control the FC-VCU 24 having a lower power efficiency ηfv and the BAT-VCU 26 having a lower power efficiency ηbv based on passing powers Pfv and Pbv so as to utilize the directly coupled state with priority.

For example, when passing powers Pfv and Pbv are used in the range from p1 to p2, the ECU 28 may control so as to put the FC-VCU 24 in the directly coupled state with priority. When passing powers Pfv and Pbv are used in the range from zero to p1 or equal to or higher than p2, the ECU 28 may control so as to put the BAT-VCU 26 in the directly coupled state with priority.

<B-3. Control of FC System 12>

In the above embodiment, the motor revolution Nmot and the motor torque Tmot are used to determine the high load state of the motor 14 (FIG. 8). However, it is not limited thereto, for example, from the viewpoint of determining switching the battery converter 26 to the directly coupled state or the step-up operation (S2 to S5 of FIG. 7). For example, the high load state may be determined by using either one of the motor revolution Nmot and the motor torque Tmot although the accuracy drops. Alternatively, the high load state may be determined based on the power consumption (measured or estimated value) of the motor 14.

In the above embodiment, when the motor 14 is not in the high load state (S3 of FIG. 7: NO), the BAT-VCU 26 uniformly enters the directly coupled state (S5). However, it is not limited thereto, for example, from the viewpoint that a voltage converter having inferior power efficiency enters the directly coupled state with priority. For example, when the motor 14 is not in the high load state (S3 of FIG. 7: NO), instead of causing the BAT-VCU 26 to enter the directly coupled state intermittently, the BAT-VCU 26 may be caused to enter the directly coupled state per a predetermined period of time (for example, per a predetermined timing in the cruise travel mode) and to perform step-up operation at other timings.

In the above embodiment, the required motor voltage Vmot_req is used as a control value of the motor 14 (FIG. 8). However, it is not limited thereto, for example, from the viewpoint of controlling operation of the motor 14. For example, the motor 14 also may be controlled by using the required input power to the motor 14.

A power supply system according to the present disclosure includes: a first power supply and a second power supply that are capable of supplying power to a load; a first voltage converter that is connected between the first power supply and the load and that is capable of boosting output voltage of the first power supply by operation of a first switching element; a second voltage converter that is connected between the second power supply and the load and that is capable of boosting output voltage of the second power supply by operation of a second switching element; and a controller configured to control operations of the first voltage converter and the second voltage converter, wherein conversion efficiency of the first voltage converter is higher than conversion efficiency of the second voltage converter in any passing power within a predetermined passing power range, in the predetermined passing power range, voltage range with which the first power supply is capable of outputting is lower than voltage range with which the second power supply is capable of outputting, and when power is supplied to the load from the first power supply and the second power supply in the state where the passing powers of the first voltage converter and the second voltage converter are within the predetermined passing power range, the controller causes the first voltage converter to perform step-up operation and causes the second voltage converter to enter a direct coupled state in which the second voltage converter stops step-up operation and supplies output voltage of the second power supply directly to the load.

According to the present disclosure, the conversion efficiency of the first voltage converter is higher than the conversion efficiency of the second voltage converter in any passing power within a predetermined passing power range. Even in the predetermined passing power range, voltage range in which the first power supply is capable of outputting is lower than voltage range in which the second power supply is capable of outputting. With the preconditions satisfied, when power is supplied to the load from the first power supply and the second power supply in the state where the passing power of the first voltage converter and the second voltage converter is within the predetermined passing power range, the controller causes the first voltage converter to perform step-up operation and causes the second voltage converter to enter the direct coupled state (direct coupling operation may be included).

Thus, power loss by the second voltage converter may be suppressed by positively using the combination of the directly coupled state by the second voltage converter having low conversion efficiency and the step-up operation by the first voltage converter having high conversion efficiency, and thereby power efficiency or energy efficiency of the power supply system as a whole may be improved.

The first switching element may have a smaller switching loss or a smaller conduction loss than the second switching element. Thus, when the first power supply is used as a main power supply, power efficiency or energy efficiency of the entire power supply system may be improved.

When supplying power to the load from the first power supply and the second power supply, the controller may cause the first voltage converter to perform the step-up operation and switch the second voltage converter to the directly coupled state or the step-up operation depending on required output of the load. Thus, by using the directly coupled state of the second voltage converter with priority and using step-up operation of the second voltage converter when increasing required output of the load, variation of the required output of the load may be responded flexibly.

The load includes an AC rotating electric machine. In addition, the power supply system may include an inverter that converts direct current from at least one of the first power supply and the second power supply to alternate current and supplies the alternate current to the rotating electric machine. Moreover, when a total value of power losses respectively of the rotating electric machine, the inverter, the first voltage converter, and the second voltage converter in a case where required input voltage or required input current of the rotating electric machine is a specific value is defined as a total power loss, the controller may cause the second voltage converter to enter the directly coupled state if the total power loss becomes smaller by causing the second voltage converter to enter the directly coupled state than by causing the second voltage converter to perform the step-up operation.

Thus, the controller determines in consideration of the total power loss whether to cause the second voltage converter to perform step-up operation or directly coupled state, and thereby drop of power efficiency or energy efficiency of the power supply system as a whole may be suppressed in an effective manner.

When supplying power to the load from the first power supply and the second power supply for a predetermined period of time, the controller may cause the first voltage converter to perform the step-up operation continuously and switch the second voltage converter to the directly coupled state or the step-up operation depending on required output of the load.

Thus, when the first voltage converter continues step-up operation during a predetermined period of time, variation of required output of the load may be responded flexibly by using the directly coupled state of the second voltage converter with priority and using step-up operation of the second voltage converter when increasing required output of the load.

A lower limit value of the output voltage of the second power supply may be higher than an upper limit value of the output voltage of the first power supply. Thus, even when the passing power of the first voltage converter and the second voltage converter varies, conversion efficiency of the first voltage converter is readily higher than conversion efficiency of the second voltage converter. This eliminates necessity of comparing conversion efficiencies while the first voltage converter and the second voltage converter are in operation, and thereby the first voltage converter may simplify control of the second voltage converter.

According to the present disclosure, energy efficiency or power efficiency as a whole may be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system comprising:
a first power supply and a second power supply to supply electric power to a load;
a first voltage converter via which the first power supply is connected to the load to boost first output voltage output from the first power supply by switching a first switching element;
a second voltage converter via which the second power supply is connected to the load to boost second output voltage output from the second power supply by switching a second switching element; and
circuitry configured to
control the first voltage converter to boost the first output voltage when the first power supply and the second power supply to supply the electric power to the load such that first passing power passing through the first voltage converter and second passing power passing through the second voltage converter are within a passing power range, conversion efficiency of the first voltage converter being higher than conversion efficiency of the second voltage converter and a voltage range of the first output voltage being smaller than a voltage range of the second output voltage in a case where the first passing power and the second passing power are within the passing power range; and control the second voltage converter to stop boosting the second output voltage so as to supply the electric power from the second power supply directly to the load when the first power supply and the second power to supply the electric power to the load such that the first passing power and the second passing power are within the passing power range.

2. The power supply system according to claim 1, wherein the first switching element has a smaller switching loss or a smaller conduction loss than the second switching element.

3. The power supply system according to claim 1, wherein when supplying the electric power to the load from the first power supply and the second power supply, the circuitry causes the first voltage converter to perform a step-up operation and switches the second voltage converter to a directly coupled state or a step-up operation depending on required output of the load.

4. The power supply system according to claim 3, wherein the load includes an AC rotating electric machine, the power supply system includes an inverter that converts direct current from at least one of the first power supply and the second power supply to alternate current and supplies the alternate current to the rotating electric machine, and when a total value of power losses respectively of the rotating electric machine, the inverter, the first voltage converter, and the second voltage converter in a case where required input voltage or required input current of the rotating electric machine is a specific value is defined as a total power loss, the circuitry causes the second voltage converter to enter the directly coupled state if the total power loss becomes smaller by causing the second voltage converter to enter the directly coupled state than by causing the second voltage converter to perform the step-up operation.

5. The power supply system according to claim 1, wherein when supplying the electric power to the load from the first power supply and the second power supply for a predetermined period of time, the circuitry causes the first voltage converter to perform a step-up operation continuously and switches the second voltage converter to a directly coupled state or a step-up operation depending on required output of the load.

6. The power supply system according to claim 1, wherein a lower limit value of the second output voltage is higher than an upper limit value of the first output voltage.

* * * * *